United States Patent [19]

Siler

[11] Patent Number: 4,714,388

[45] Date of Patent: Dec. 22, 1987

[54] DUAL PINION ANTI-BACKLASH CARRIAGE DRIVE FOR A MACHINE TOOL

[75] Inventor: G. Daniel Siler, Dayton, Ohio

[73] Assignee: Dayton Machine Tool Company, Dayton, Ohio

[21] Appl. No.: 918,296

[22] Filed: Oct. 14, 1986

[51] Int. Cl.⁴ .................................. B23Q 23/00
[52] U.S. Cl. ........................... 409/146; 74/409; 409/174
[58] Field of Search ............... 409/145, 146, 174, 159, 409/164, 172, 174; 74/409, 440

[56] References Cited

U.S. PATENT DOCUMENTS

| | | |
|---|---|---|
| 1,372,979 | 3/1921 | Norris .................................. 409/145 |
| 2,070,807 | 7/1937 | Roehm et al. |
| 2,889,755 | 10/1959 | Schroeder |
| 2,902,875 | 5/1959 | Finally et al. |

FOREIGN PATENT DOCUMENTS

| | | | |
|---|---|---|---|
| 686669 | 10/1940 | Fed. Rep. of Germany ...... 409/146 |
| 71874 | 4/1983 | Japan ..................................... 409/145 |
| 1021789 | 3/1966 | United Kingdom ................ 409/145 |
| 897467 | 1/1982 | U.S.S.R. .............................. 409/146 |

*Primary Examiner*—Z. R. Bilinsky
*Attorney, Agent, or Firm*—Jacox & Meckstroth

[57] ABSTRACT

A carriage or slide of a machine tool is moved along a supporting guideway or way by a pair of driven pinions engaging a rack, and each pinion is mounted on the output shaft of a corresponding planetary gearbox. The input shafts of the gearboxes are driven by a reversible electric motor through an endless belt and pulley system. A pair of belt tension wheels engage the endless belt and are supported by a set of spring biased slide members which cooperate to establish a predetermined tension in the belt and a predetermined preload torque on the input and output shafts of the gearboxes to produce a corresponding anti-backlash force of the pinions against the rack.

13 Claims, 6 Drawing Figures

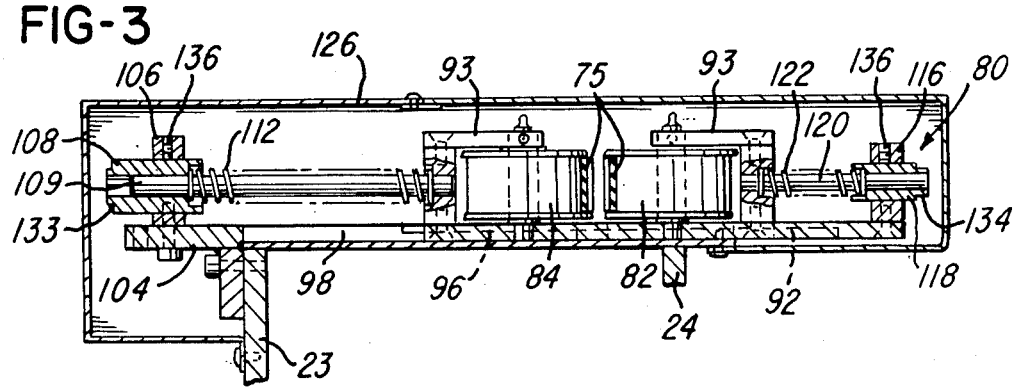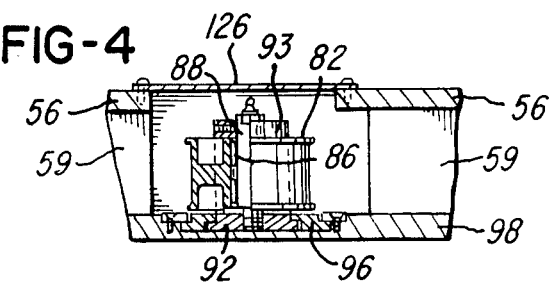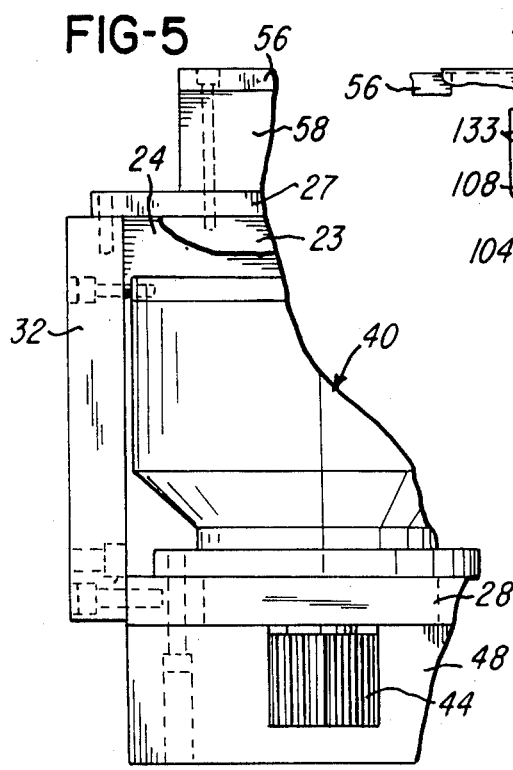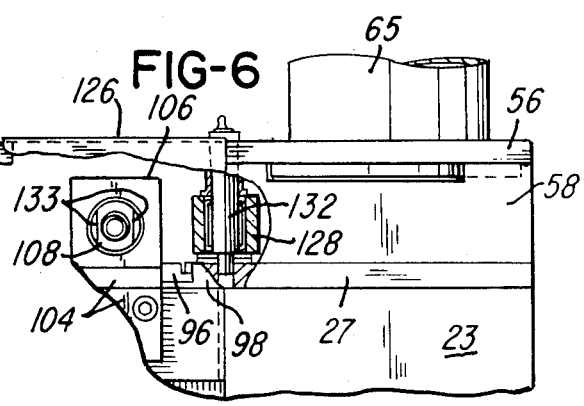

DUAL PINION ANTI-BACKLASH CARRIAGE DRIVE FOR A MACHINE TOOL

BACKGROUND OF THE INVENTION

In a machine tool having a carriage or slide which moves along a linear guideway, it is sometimes desirable to move the carriage or slide by means of a motor deriven pinion which engages a rack extending along the way. In order to obtain precision movement of the slide without any play, dual drive pinions are used to engage the rack at longitudinally spaced positions, for example, as disclosed in U.S. Pat. Nos. 2,070,807, 2,889,755 and 2,902,875. The dual pinions are driven in such a manner to eliminate backlash between the teeth of the pinions and the teeth of the rack and thereby provide for precision and positive movement of the slide or carriage. As dsclosed in the above-mentioned patents, the reversible drives for the dual pinions and the preloading mechanism are complex and relatively expensive to construct and maintain. it is also desirable to minimize the normal preload torque on the drive pinions in order to minimize wear on the rack and pinions. Thus the normal torque or preload should be sufficient to overcome only frictional resistance of the slide and to maintain light machining of a workpiece. If the preload torque or force must be normally set for heavy or maximum machining forces, the pinions and rack receive excessive wear and require undesirable maintenance.

SUMMARY OF THE INVENTION

The present invention is directed to improved apparatus for moving a carriage or slide along a way of a machine tool and which provides for obtaining precision movement of the slide during both heavy machining and light machining operations. The apparatus of the invention also provides for minimizing wear and is economical to produce and service. The drive apparatus further provides for conveniently adjusting the preload forces on the drive and for automatically increasing the preload forces when required during heavy cutting or machining of workpieces.

In accordance with one embodiment of the invention, the carriage or slide drive apparatus incorporates a pair of planetary gearboxes having output shafts supporting a corresponding pair ofpinions which engage a rack extending parallel to the way of a machine tool. The input shafts of the gearboxes are driven by an endless belt and pulley system, and a pair of belt tension wheels are supported for producing a predetermined tension in the belt and predetermined preload torques on the input shafts of the gearboxes to produce opposing preload forces of the pinions against the rack.

Other features and advantages of the invention will be apparent from the following description, the accompanying drawings and the appended claims.

BRIEF DESCRIPTION OF THE DRAWINGS

FIG. 3 is a section taken generally on the line 3—3 of FIG. 1;

FIG. 4 is a fragmentary section taken generally on the line 4—4 of FIG. 1;

FIG. 5 is a fragmentary elevational view taken generally on the line 5—5 of FIG. 2; and FIG. 6 is a fragmentary section taken generally on the line 6—6 of FIG. 1.

DESCRIPTION OF THE PREFERRED EMBODIMENT

Figure 1:
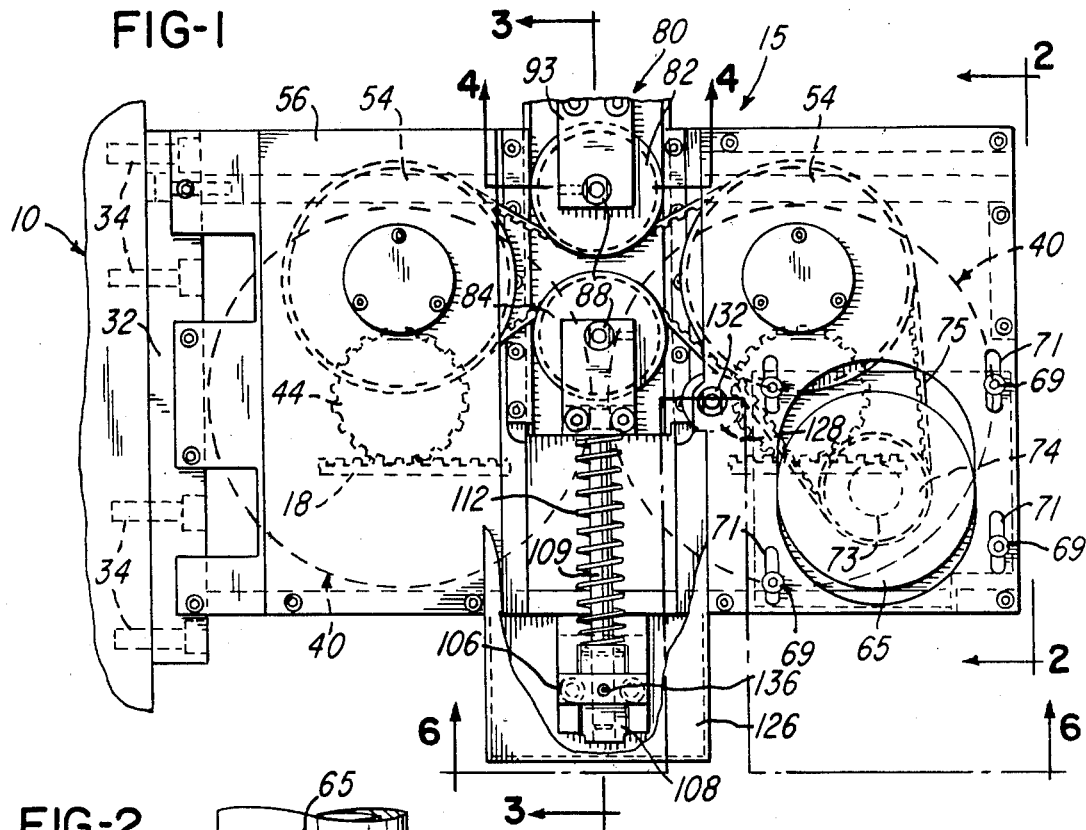
FIG. 1 is a plan view of drive apparatus constructed in accordance with the invention for moving a slide or carriage of a machine tool.
Figure 2:
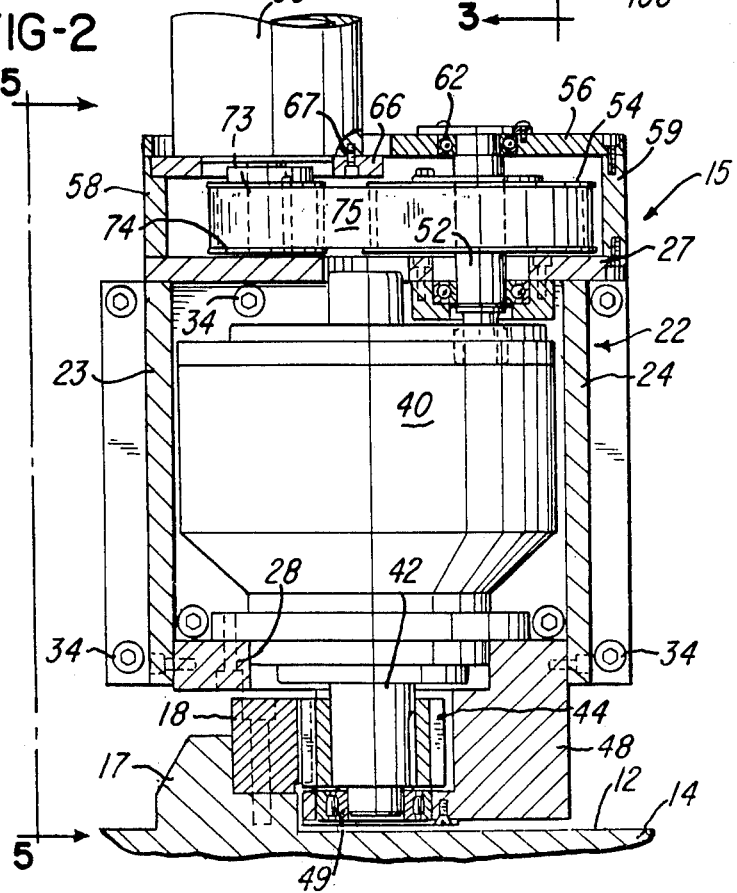
FIG. 2 is an elevational view of the apparatus as taken generally on the line 2—2 of FIG. 1.

Referring to FIG. 1, a slide or carriage 10 is moved along a linear guideway or way 12 (FIG. 2) on the bed 14 of a machine tool by drive apparatus 15 constructed in accordance with the invention. The way 12 and bed 14 may extend a substantial distance, for example, over fifty feet. The bed 14 has a portion 17 which supports an elongated rack 18 extending the full length of the way 12.

The apparatus 15 includes a box-shaped fabricated metal frame 22 (FIG. 2) having parallel spaced vertical side plates or walls 23 and 24 rigidly connected by an upper horizontal wall 27 and a lower horizontal base wall 28. The plates or walls 23, 24, 27 and 28 are rigidly secured to a vertical support plate 32 (FIG. 1) which is secured to the carriage 10 by a set of screws 34 so that the apparatus 15 is supported by the carriage 10 in a cantilevered manner. The frame 22 supports and encloses a pair of planetary gearboxes 40 which have corresponding vertical output shafts 42 and a reduction ratio of 49.75 to 1. A set or pair of pinions 44 are secured to the output shafts 42 of the gear boxes 40 and engage the rack 18 at longitudinally spaced positions. A base assembly 48 is secured to the bottom plate or wall 28 of the frame 22 and retains a pair of anti-friction bearings 49 which support the lower ends of the output shafts 42 of the gear boxes 40.

The gearboxes 40 have corresponding vertical input shafts 52 which project upwardly through corresponding holes within the upper wall 27, and a pair of timing gears or pulleys 54 are mounted on the input shafts 52 of the gearboxes 40. A top plate or wall 56 is located above the pulleys 54 and is supported by the upper wall 27 through a set of end riser plates or walls 58 and 59. The upper end portion of each input shaft 52 is supported by an anti-friction bearing 62 retained within the top plate or wall 56.

A reversible DC servomotor 65 is mounted on a motor support plate 66 by a set of screws 67, and the motor support plate 66 is secured to the bottom surface of the top plate or wall 56 by a set of screws 69 (FIG. 1) which extend through adjustable slots 71 within the top plate 56. The motor 65 has a depending output shaft 73 (FIG. 2) which supports a drive pulley 74. An endless flexible timing belt 75 has longitudinally spaced teeth and engages the teeth of the pulleys 54 and drive pulley 74, as shown in FIG. 1. The tension in the belt 75 and the preload torques on the pulleys 54 are controlled by a mechanism 80 which includes a pair of idler wheels 82 and 84. The belt 75 extends between the wheels 82 and 84, and the idler wheel 82 is supported for rotation by an anti-friction bearing 86 (FIG. 4) mounted on a shaft 88 having a lower end portion secured to a slide member 92. The upper end portion of the shaft 88 is retained by an L-shaped bracket 93 (FIG. 3) which is also secured to the slide member 92.

The slide member 92 is supported for linear movement within another slide member 96 (FIG. 4) which, in turn, is supported for linear movement within a plate 98 (FIG. 3) mounted on the side walls 23 and 24 of frame 22. The idler wheel 84 is also supported by a bearing 86 mounted on a shaft 88, and the upper end portion of the shaft 88 is secured to the slide member 96 by another angle bracket 93.

An L-shaped bracket 104 (FIG. 3) is secured to the frame wall 23 and supports a nut member 106 which receives an externally threaded adjustment tube or sleeve 108. A rod 109 has one end portion slidably received within the sleeve 108 and an opposite end portion secured to the bracket 93. A compression spring 112 surrounds the rod 109 and extends between the adjustment sleeve 108 and the bracket 93 for urging or biasing the slide member 96 and idler wheel 84 towards the timing belt 75.

As also shown in FIG. 3, another nut member 116 is mounted on the right end portion of the plate 98 and receives an externally threaded adjustment tube or sleeve 118. The sleeve 118 slideably receives a guide rod 120 which is secured to the bracket 93 and is surrounded by a compression spring 122. Thus the spring 122 urges the idler wheel 82 towards the idler wheel 84 by moving the bracket 93 and slider member 92 within the supporting slide member 96.

A removable sheet metal cover 126 encloses the tension and preload mechanism 80, and a stationary idler wheel 128 (FIGS. 1 and 6) also engages the belt 75 between the idler wheel 84 and the drive pulley 74. The wheel 128 is rotatably supported by an anti-friction bearing mounted on a shaft 132 (FIG. 6) supported by the lower plate 27 and upper plate 56 of the frame 22. As shown in FIGS. 3 and 6, the outer end portion of the adjustment sleeve 108 has opposite flats 133, and the sleeve 118 has similar flats 134 to provide for rotatably adjusting the sleeves 108 and 118 with a suitable wrench after the lock screws 136 are released.

Referring to FIG. 1, the tension in the timing belt 75 is selected by adjusting the pressure exerted by the idler wheel 82 against the belt 75 by adjusting the sleeve 118 (FIG. 3) to select the force exerted by the compression spring 122. Preferably this tension corresponds with the maximum power output of the servomotor 65. The sleeve 108 is then adjusted axially for selecting the preload force or torque applied by the belt 75 to the pulleys 54. This preload force applies a counter-clockwise torque to the left puley 54 shown in FIG. 1 and a clockwise torque to the right pulley 54. These counter opposing torques are applied to the corresponding pinions 44 and against the rack 17 through the planetary gearboxes 40.

The normal preload force on the timing blet 75 is preferably selected according to the combination of the force required to overcome the frictional resistance of the carriage or slide 10 on the way 12 plus the additional force required to move the slide 10 during light machining of a workpiece carried by the slide 10. For example, if the frictional resistance to movement of the slide 10 is 5,000 pounds and the additional force required to move the slide and workpiece during light machining is 2,000 pounds, the preload within the belt 75 may be set to produce a force of the pinions 44 against the rack 18 of approximately 7,000 pounds.

When the motor 65 is driven in a direction to rotate the pulleys 54 in a clockwise direction (FIG. 1), the right pulley 54 and corresponding pinion 44 is driven directly by the motor and through the belt 75 to move the slide 10 towards the right in FIG. 1. When the pulley 54 on the right is rotated clockwise by the belt 75, the preload on the left pulley 54 remains at the normal preload both during light maching and heavy machining. When the pulleys 54 are driven in a counter-clockwise direction by the motor 65 and a heavy maching force is required, the preload spring 112 compresses to increase the preload, and the right pulley 54 "catches up" with the left pulley 54 to produce the necessary torques on the pinions 44 to perform the heavy machining operation. When the heavy machining subsides, the idler wheels 82 and 84 shift with the slide member 96 until the preload returns to its normal condition.

From the drawings of the above description, it is apparent that a carriage or slide drive apparatus constructed in accordance with the invention provides desirable features and advantages. As one important advantage, the apparatus provides for minimizing the normal preload on the dual drive pinions so that wear between the pinions and the rack is minimized. The low normal preload also greatly extends the useful life of the planetary gearboxes 40 as well as the useful life of the entire apparatus before major rebuilding is required. As another advantage, the mechanism 80 provides for automatically increasing the preload on demand when it is necessary during a heavy cutting or machining operation. In addition, the forces exerted by the compression springs 112 and 122 may be easily adjusted for selecting the desired belt tension and normal preload forces and for precision calibration after any wear between the pinions 44 and rack 18. Calibration for wear may also be accomplished by simply advancing the timing belt 75 by one tooth relative to one of the pulleys 54.

The apparatus of the invention is also compact and more economical to produce than other carriage or slide drive apparatus capable of producing the same torques and forces as the apparatus ofthe invention. It is also within the scope of the invention to use a double tooth timing belt with teeth on both the inner and outer surfaces and to use idler wheels 82 and 84 having teeth. In this construction, the belt tension idler wheel 82 may be coupled to a feedback resolver or encoder which may be used to provide an indication of precisely where the carriage or slide 10 is located on the way 12 of the machine tool bed 16. With the rotation of the belt tension wheel 82 being sensed to control a feedback device, no other feedback system is required.

While the form of drive apparatus herein described constitutes a preferred embodiment of the invention, it is to be understood that the invention is not limited to the precise form of apparatus described, and that changes may be made therein without departing from the scope and spirit of the invention as defined in the appended claims.

The invention having thus been described, the following is claimed:

1. Apparatus adapted for moving a carriage or slide along guide ways of a machine tool having an elongated rack, said apparatus comprising a frame, a set of gearboxes supported by said frame and having corresponding input and output shafts, a set of pinions connected to said output shafts and positioned to engage the rack at longitudinally spaced locations, a reversible motor supported by said frame and having a motor shaft, a set of pulleys connected to said motor shaft and to said input shafts of said gearboxes, an endless flexible elongated belt having longitudinally spaced teeth and connecting said pulleys to provide for driving said pinions through said gearboxes in response to rotation of said motor shaft, a set of belt tension wheels engaging said belt, means supporting said belt tension wheels for movement as a unit relative to said frame, and means for biasing said belt tension wheels in a manner to produce a selected tension in said belt and a corresponding torque on each of said input shafts of said gearboxes for preloading said pinions against the rack.

2. Apparatus as defined in claim 1 and including means for supporting a first said belt tension wheel for movement relative to a second said belt tension wheel, and adjustable biasing means for urging said first belt tension wheel in a direction to establish a predetermined tension within said belt.

3. Apparatus as defined in claim 2 wherein said belt comprises a generally flat timing belt extending between said first and second belt tension wheels.

4. Apparatus as defined in claim 1 wherein said belt tension wheels are supported by a slide for movement as a unit.

5. Apparatus as defined in claim 1 wherein said gearboxes comprise planetary gearboxes having substantial reduction, said pinions are mounted on said output shafts, and said pulleys are mounted on said input shafts.

6. Apparatus as defined in claim 1 wherein said means supporting said belt tension wheels comprise a first guide member supported by said frame for linear movement, one of said belt tension wheels mounted on said first guide member, a second guide member supported for linear movement by said first guide member, a second said belt tension wheel supported by said second guide member, a first coil spring positioned to move said first guide member, and a second coil spring positioned to move said second guide member relative to said first guide member.

7. Apparatus as defined in claim 1 wherein said means supporting said belt tension wheels are disposed for moving said belt tension wheels in a direction generally normal to a plane defined by the axes of said input shafts of said gearboxes.

8. Apparatus adapted for moving a carriage or slide along guide ways of a machine tool having an elongated rack, said apparatus comprising a frame, drive means supported by said frame and having a corresponding pair of input shafts and a corresponding pair of output shafts, a set of pinions connected to said output shafts and positioned to engage the rack at a longitudinally spaced locations, a reversible electric motor supported by said frame and having a motor shaft, a set of pulleys having peripherally spaced teeth and connected to said motor shaft and to said input shafts, an endless flexible elongated timing belt having longitudinally spaced teeth and connecting said pulleys to provide for driving said pinions through said drive means in response to rotation of said motor shaft, a set of belt tension wheels engaging said belt, means supporting said belt tension wheels for lateral movement as a unit relative to said belt, and means for biasing said belt tension wheels in a manner to produce a selected normal tension in said belt and a normal torque on each of said input shafts for preloading said pinions against the rack.

9. Apparatus as defined in claim 8 wherein said means supporting said belt tension wheels comprise a first slide member supported by said frame for linear movement, one of said belt tension wheels supported for rotation by said first slide member, a second slide member supported for linear movement by said first slide member, a second said belt tension wheel supported for rotation by said second slide member, first biasing means positioned to move said first slide member, and second biasing means positioned to move said second slide member relative to said first slide member.

10. Apparatus as defined in claim 9 wherein said first and second slide members are disposed for moving said belt tension wheels in a direction generally normal to a plane defined by the axes of said input shafts.

11. Apparatus adapted for moving a carriage or slide along guide ways of a machine tool having an elongated rack, said apparatus comprising a frame, a pair of planetary gearboxes supported by said frame and having corresponding input and output shafts, a set of pinions mounted on said output shafts and positioned to engage the rack at longitudinally spaced locations, a reversible electric motor supported by said frame and having a motor shaft extending parallel to said input and output shafts, a set of pulleys having peripheryally spaced teeth and mounted on said motor shaft and said input shafts of said gearboxes ,an endless flexible and generally flat elongated timing belt having longitudinally spaced teeth and connecting said pulleys to provide for driving said pinions through said gearboxes in response to rotation of said motor shaft, a set of belt tension wheels having parallel spaced axes and positioned with said belt therebetween, a first slide member supporting said belt tension wheels for movement as a unit in a linear direction perpendicular to a plane defined by the axes of said input shafts, a second slide member supporting one of said belt tension wheels for movement relative to a second said belt tension wheel in the same said linear direction, and adjustable spring means for biasing said slide members and said belt tension wheels in said linear direction to produce a selected tension in said belt and a corresponding torque on each of said input shafts of said gearboxes for preloading said pinions against the rack.

12. Apparatus as defined in claim 11 wherein the axes of all of said shafts are vertical.

13. Apparatus as defined in claim 11 wherein said adjustable spring means comprise a set of generally aligned guide rods connected to corresponding said first and second slide members and said belt tension wheels, a set of compression springs mounted on said guide rods, and adjustable threaded sleeves receiving said guide rods and disposed for compressing said springs to urge said belt tension wheels toward said endless belt.

* * * * *